3,065,095
PROCESS FOR PREPARING CHROMIUM OXIDE
Raymond A. Foos, Loveland, and Edgel P. Stambaugh, Montgomery, Ohio, assignors to National Distillers and Chemical Corporation, New York, N.Y., a corporation of Virginia
No Drawing. Filed Aug. 26, 1959, Ser. No. 836,057
6 Claims. (Cl. 106—300)

This invention relates to a method for the preparation of finely divided chromium oxide and hydrates thereof. More particularly, the invention pertains to a new and improved method for recovering purified, finely divided chromium oxide from acidic solutions thereof.

Chromium oxide is currently prepared by reacting sodium dichromate with sulfur. Other methods involve precipitation of chromic acids with alkali, fusing potassium dichromate with boric acid, oxidation of chromium hydroxide, etc. The sodium dichromate-sulfur method comprises soda ash fusion of chrome ore, water leaching the resulting frit to separate certain impurities from the chromium, hydrolysis of the raw chromate liquor to remove aluminum, and treatment of the chromate liquor with sulfuric acid to convert it to the soluble dichromate. The resulting dichromate solution is then partially evaporated to crystallize out sodium dichromate which is subsequently treated with sulfur. It is also possible to react chromite ore with carbon to form ferrochrome. Chromium oxide can be recovered from this material by a process comprising acid dissolultion, addition of ammonium sulfate to the solution, cooling to about 0° C. to fractionally crystallize $FeSO_4 \cdot (NH_4)_2SO_4$, filtration, and caustic precipitation of chromium oxide.

It is apparent that these prior art processes utilize large amounts of chemicals and require the removal of impurities prior to recovering chromium oxide. Since many operating steps are necessary, the processes are poor in efficiency and expensive. In addition, it should be pointed out that a high purity chromium salt or a solution thereof is required as an intermediate product, if high purity chromium oxide is desired. Chromium oxide is used as a pigment to impart color to glass and ceramic ware, etc. It is also useful as a cracking catalyst or as a feed material for the preparation of chrome metal by silicothermic, aluminothermic, or electrolytic processes.

One object of this invention is to provide a method for recovering finely divided chromium oxide or hydrates thereof which avoids the disadvantages of the prior art processes. Another object of the invention is to provide a direct method for preparing the metal oxide or hydrate which does not require the use of alkaline materials as the precipitating agent. A further object of the invention is to prepare purified chromium oxide or hydrate thereof from ores and ore products containing metallic impurities such as aluminum, iron, magnesium, nickel, lead, etc. Other objects will become apparent from the ensuing description of the invention.

In accordance with the present invention, it has now been found that finely divided high purity chromium oxide can be prepared directly from aqueous, chromium-containing acidic solutions. The process comprises heating the chromium-containing solution at temperatures above the boiling point of the solution and generally above about 180° C., preferably about 200° to 250° C., and under a superatmospheric pressure of at least about 150 p.s.i., preferably about 300 to 400 p.s.i. This treatment will be continued for about 2 to 90 minutes, preferably about 5 to 10 minutes, for precipitation of the purified chromium oxide. This period does not include the time required to heat the feed solution from room temperature to the treatment temperature. In accordance with the preferred method of operation, the solution undergoing the aforementioned treatment can be subjected to continuous agitation or stirring to promote a faster reaction rate and a more finely divided product. The resulting chromium oxide hydrate precipitates from the solution with an average particle size of from about 0.5 to 20 microns and usually about 1 to 5 microns. After the pressure has been released, the resulting slurry is filtered to recover the finely divided, solid hydrate of chromium oxide. If the chromium-containing feed solution contains impurities such as aluminum, iron, magnesium, nickel, cobalt, lead and the like, the chromium oxide product was found to have a markedly lower content of these metallic impurities. By operating in this manner, chromium oxide hydrate of pigment and catalyst quality can be prepared directly from impure material.

The chromium-containing acid solutions useful as a feed material in the present invention may be derived from any source. In general, ferrochrome of commercial quality containing from 30 to 65 percent by weight chromium can be dissolved directly in sulfuric acid. This feed solution contains chromium, in the form of chromium sulfate, sulfuric acid and water. It is also possible to employ in place of all or a part of the sulfuric acid other mineral acids or organic acids. Illustrative acids are hydrochloric, nitric, acetic, formic and mixtures thereof. An alternate method for preparing the feed solution comprises soda ash fusion of chromite ore followed by water and acid leaching of the frit to form an acidic chromium solution. Although large amounts of sodium salts would be present in the feed solution, they do not interfere with the inventive process. Pure or impure chromous oxide, chromic oxide, chromic salts such as potassium chromate, sodium chromate, chromic chloride, iron chromate, chromic sulfate etc. can also be dissolved in water or acid to prepare the feed solution.

The amount of chromium oxide present in the feed solution will range from about 5 to 150 grams per liter, preferably about 25 to 50 grams per liter. The acid concentration, calculated as a total titratable acid including both free and combined acid, will be about 20 to 150 grams per liter, preferably 40 to 80 grams per liter, depending upon the concentration of the chromium. It was found that, following the prescribed treatment, the acid concentration in the filtrate should not exceed about 10% in order to obtain high yields. At higher concentrations, there is a tendency for the reaction to be reversed and for the chromium oxide hydrate to dissolve. Consequently low acid concentrations in the filtrate are preferred to insure high yields. The desired acidity range can be maintained by the addition of controlled amounts of alkaline materials such as ammonium hydroxide, sodium hydroxide, potassium hydroxide and the like. The feed solution need only contain the amount of water necessary to effect the desired hydrolysis reaction.

In accordance with another embodiment of this invention, solid materials such as carbon, calcium sulfate, silicon dioxide, titanium dioxide, barium sulfate, etc. can be added to the water solution prior to the high temperature-high pressure treatment. By utilizing this feature it is possible to prepare heterogeneous mixtures of the precipitated chromium oxide hydrate and the additive material. The chromium oxide-carbon mixture obtained by this method can be used directly for the preparation of high purity chromium chlorides. The chromium oxide additive material mixture prepared by this precipitation method would have utility as a paint pigment. The amount of additive material employed can obviously vary over a wide range. This aspect of the invention will be more fully illustrated below.

Any conventional type pressure kettle or vessel, such as a Parr autoclave, provided with agitation means if desired, can be employed in carrying out the process of this invention. The process can be continuous or batchwise, and the dissolution and precipitation steps can be carried out in the same vessel. After the heat treatment under pressure, as described above, has been completed, the pressure is released and the resulting mixture or slurry is filtered. The filter cake will contain the finely divided chromium oxide hydrate and additive materials, if employed. In general, it is preferred to filter the mixture while it is still hot, i.e., at a temperature of about 60° to 90° C. in order to eliminate any tendency for peptization. The filter cake, if the filtrate contains metallic impurities, is generally washed with water or an acid solution. An illustrative acid solution is 10% hydrochloric acid, although other mineral acids may be employed for this purpose. The process can be repeated a number of times or carried out in several stages, if ultra high purity products are desired. If anhydrous or dehydrated metal oxides are desired, calcination by any of the standard methods can be employed. As noted above, the method of this invention results in the preparation of high quality finely divided chromium oxide in outstanding yields. The quality and the fine state of subdivision of the product are particularly desirable for many of the well known uses of chromium oxides.

The following examples will serve to illustrate the practice of this invention:

EXAMPLE I

Stock solutions of chromium sulfate, as shown in the accompanying table, were prepared by dissolving commercial ferrochrome in sulfuric acid followed by filtration at room temperature to remove the insoluble material. Dissolution of the ferrochrome was 90 percent or more when carried out at 100° C. for 10 to 15 hours. The resulting solution contained 29.1 grams per liter of chromium and had a total titratable acid concentration of about 100 grams per liter. Sufficient sodium hydroxide was added to reduce the titratable acid concentrations to those shown in the runs of Table I. The resulting feed solutions were treated at 225° C. and 400 p.s.i. for 60 minutes. After cooling and releasing the pressure, the chromium oxide hydrate was leached with dilute hydrochloric acid, filtered and calcined at 800° C. to form green $Cr_2O_3$. The yields as shown in Table I varied from 16 to 95% by weight based on the amount of chromium in the feed and clearly indicate that acid concentration should be maintained below about 65 grams per liter for highest yields at this particular chromium concentration. Similar excellent yields could also be obtained at lower temperatures and pressures as well as in shorter operating times by utilizing decreased acidities.

Table I

| Runs | Feed Solution | | Recovery of $Cr_2O_3$, Percent |
|---|---|---|---|
| | $H_2SO_4$ Conc., g./l. | Cr Conc., g./l. | |
| (a) | 60.0 | 29.1 | 95.0 |
| (b) | 73.0 | 29.1 | 50.0 |
| (c) | 80.0 | 29.1 | 16.4 |

EXAMPLE II

The process outlined in Example I was repeated using hydrochloric acid instead of sulfuric acid. The resulting feed solution had a chromium concentration of about 40 to 45 grams per liter and an acid concentration of 60 to 106 grams per liter. Treatment of this material at 400 p.s.i. and 225° C. for 60 minutes as shown in Table II gave $Cr_2O_3$ yields of 26 to 80 percent by weight based on the amount of chromium in the feed, depending upon the acid concentration used. As in Example I the highest yields were obtained at the lower acidities, thus indicating the preference of operating below about 80 grams per liter at this chromium concentration.

Table II

| Runs | Feed Solution | | Recovery of $Cr_2O_3$ Percent |
|---|---|---|---|
| | HCl Conc., g./l. | Cr Conc., g./l. | |
| (a) | 60.0 | 38.5 | 80.0 |
| (b) | 85.0 | 40.6 | 46.9 |
| (c) | 106.0 | 45.5 | 26.7 |

Analysis of the starting commercial ferrochrome and the products obtained therefrom by a one step selective precipitation process described in Examples I and II are shown in Table III. Data are included for both the chloride and sulfate systems. It can be noted that the iron level in the starting material was reduced by a factor of 10 to 20, while impurities such as aluminum, copper, magnesium, manganese, nickel and vanadium were also reduced to pigment and catalyst-grade levels. Removal of iron and other metallic impurities to even lower levels could be obtained by a careful control of the precipitation conditions and/or the use of several treatments.

Table III [1]

| Component | Commercial Fe-Cr | $Cr_2O_3$ [2] (HCl) | $Cr_2O_3$ [3] ($H_2SO_4$) |
|---|---|---|---|
| Al | 0.1–1.0 | <0.02 | <0.02 |
| Cu | 0.01–0.1 | 0.001–0.01 | 0.002–0.02 |
| Fe | 28.8 | 1.43 | 2.81 |
| Mg | 0.01–0.1 | 0.002–0.02 | 0.002–0.02 |
| Mn | 0.005–0.05 | <0.005 | 0.001–0.01 |
| Ni | 0.1–1.0 | 0.05–0.5 | 0.05–0.5 |
| Si | 0.1–1.0 | 0.05–0.5 | 0.02–0.2 |
| V | 0.3–3.0 | 0.1–1.0 | 0.05–0.5 |
| Cr | 65 | >98 | >97 |

[1] Analysis on a metal basis and in percent.
[2] Run (b) of Table II.
[3] Run (a) of Table I.

EXAMPLE III

Ten grams of carbon in the form of lampblack is added to one liter of feed solution containing 60.0 grams per liter of sulfuric acid and 29.1 grams per liter of chromium. The slurry is heated in a Parr autoclave with continuous stirring at a temperature of 225° C. and 400 p.s.i. for about 10 minutes. After the pressure is released, the resulting mixture is cooled to 70° to 90° C. and filtered. A heterogeneous mixture of finely divided chromium oxide hydrate and lampblack is recovered, which upon analysis indicates an 85 percent by weight recovery of the chromium oxide. Metallic impurities were markedly reduced.

While particular embodiments of this invention are shown above, it will be understood that the invention is obviously subject to variations and modifications without departing from its broader aspects. For example, some or all of the supernatant liquids recovered during the filtration steps can be advantageously recycled to the dissolution step with or without clean up treatment depending upon the amount of impurities present. The primary filtrate from the ferrochrome process, for example, can be treated with organic solutions containing acid alkyl phosphates, such as di-2-ethylhexyl phosphoric acid in kerosene, to preferentially extract the iron while leaving the chromium in the recycled solution. Other methods of purification such as addition of organic precipitants, ion exchange, or volatilization of the water and/or acid could also be employed. This ability to reuse the supernatant liquids to recover the acids and soluble chromium oxide is obviously another advantage to the inventive process. By operating in this manner yields can be markedly improved even for high acid concentrations and any useful material in the filtrates can be recovered.

What is claimed is:

1. A process for preparing purified, finely-divided, solid $Cr_2O_3$ which comprises heating at a temperature above about 180° C. and at a pressure above about 150 p.s.i. an aqueous, chromium-bearing acid solution containing metallic impurities and having an acid concentration within the range of 20 and 80 grams per liter, the acid being selected from the group consisting of sulfuric, hydrochloric, nitric, acetic, formic, and mixtures thereof, to precipitate purified, finely-divided, solid $Cr_2O_3$.

2. The process of claim 1 wherein said acid is sulfuric.

3. The process of claim 1 wherein said acid is hydrochloric.

4. The process of claim 1 wherein said temperature is within the range of about 200° to 250° C. and said pressure is within the range of about 300 to 400 p.s.i.

5. The process of claim 1 wherein said acid solution contains an inert, solid material selected from the group consisting of carbon, calcium sulfate, silicon dioxide, titanium dioxide, and barium sulfate; a heterogeneous mixture of $Cr_2O_3$ and the inert, solid additive material is precipitated; and said precipitated mixture of finely-divided, solid $Cr_2O_3$ and additive material is recovered.

6. The process of claim 5 wherein said additive material is carbon.

References Cited in the file of this patent

UNITED STATES PATENTS

| | | |
|---|---|---|
| 1,723,556 | Myer et al. | Aug. 6, 1929 |
| 2,247,820 | Ruthruff | July 1, 1941 |
| 2,335,365 | Smith | Nov. 30, 1943 |
| 2,339,349 | Morey | Jan. 18, 1944 |
| 2,601,306 | Lloyd et al. | June 24, 1952 |
| 2,956,955 | Arthur | Oct. 18, 1960 |

FOREIGN PATENTS

| | | |
|---|---|---|
| 291,249 | Great Britain | May 31, 1928 |